Patented Oct. 18, 1932

1,882,834

UNITED STATES PATENT OFFICE

LLOYD A. HALL, OF CHICAGO, AND EDWIN E. MORTELL, OF KANKAKEE, ILLINOIS, ASSIGNORS, BY MESNE ASSIGNMENTS, TO J. W. MORTELL COMPANY, A CORPORATION OF ILLINOIS

ASPHALT EMULSION AND MANUFACTURE THEREOF

No Drawing. Application filed August 15, 1929. Serial No. 386,000½.

The present invention relates to asphalt emulsions and has special reference to a composition and to the method of compounding, whereby a stable emulsion is formed which is capable of dilution to form a thinner stable emulsion.

The present invention deals with emulsions of asphaltic substance, colloidal mineral matter, and water as the dispersing medium. The emulsion of this invention is one in which a high degree of emulsification is obtained, and in which permanence and stability characterize the product. The emulsion does not break on long standing at ordinary temperatures down to freezing. Freezing does not permanently injure the product, for the emulsions which have been frozen may be readily rejuvenated by mixing at normal temperatures of about 70° F. to 75° F., reforming the original stable emulsion. The emulsion is normally made as a smooth paste containing such minute particles that its permanence is assured. It is then diluted as required.

One object of the invention is the formation of an emulsion with a composition assuring a high degree of stability.

Another object of the invention is the use of a method of compounding which insures stabilization of the product.

Still another object of the invention is the chilling of heated newly emulsified liquid during the last stages of emulsification, to set the asphalt in its emulsified condition.

Various other objects and advantages of the invention will become apparent to those skilled in the art from the following description of the preferred manner of compounding the preferred composition, which is given herein for the purpose of illustrating and explaining the invention in such a way as to permit others to obtain the product herein described.

In carrying out the invention it is to be understood that the same is not limited to or by the specific disclosures herein made, as there are contemplated numerous variations and modifications, which fall within the scope of the appended claim.

The invention contemplates the use of colloidal clays generally, and of asphaltic materials generally, as each is known and understood in the art. The asphaltic substance may be natural asphalt or pitch, or it may be a tarry residue from petroleum stills and the like, or other substances of like nature. Nevertheless, the specific composition described is the preferred form of the invention because it exhibits properties which are highly desirable, and because it is more stable and more useful than emulsions made otherwise of which we have knowledge.

In general the process of emulsification is continued during the compounding of a batch of the product. First, there is formed a heated clay suspension in water, to a portion of which at the start a quantity of heated asphalt is added. Then both heated clay suspension and heated asphalt are added in equivalent proportions for making the composition, these being run into the preliminary emulsion during emulsification so that neither component is in excess. Under these conditions practically all of the emulsion particles are formed in the same manner and under closely identical conditions. When the emulsion is thus formed it is heated by the heat of the constituents, but has cooled somewhat in the agitation process. Further cooling is effected rapidly by adding cold water with emulsifying agitation so as to effect cooling of the emulsion during formation to a temperature which is at least not higher than the softening point of the asphalt.

In practice we employ a collodial clay such as bentonite. Ordinary air-dried bentonite contains about 8% or less of moisture. About one pound of air-dried bentonite is made up to a gallon of water suspension and heated. The suspension may be made by grinding the clay in water in a ball mill. It may be heated to a temperature of about 100° F. to 125° F. preferably the latter temperature.

Softened or melted asphaltic substance is then added to a portion of the clay suspension that is to enter into a batch of the product, and emulsification is effected. This preliminary emulsion is the vehicle in which the remainder of the constituents are emulsified. We use an asphalt which melts at about 100° F. to 105° F., and heat it for use in the process to a temperature of 275° F. to 300° F., preferably the latter. In practice about 5% of the clay suspension and the asphalt are preliminarily emulsified to provide a vehicle for emulsification of the remainder. When this small portion is mixed and partially or wholly emulsified, the remaining portions of the asphalt and of the clay suspension are run into the mass, usually in a kettle equipped for agitation for emulsification, over a period of 15 to 20 minutes. To 30 gallons of clay suspension about 45 gallons of asphalt are added. The agitation is then continued for about 40 to 50 minutes, during which time the mass cools of its own accord. When the asphalt is employed at 300° F. and the clay suspension at 125° F., we have found the temperature to be about 115° F. at the end of the 40 to 50 minute period above mentioned.

Rapid cooling is then effected, preferably with dilution, by adding a quantity of cold water. For the above mentioned batch we add about 20 gallons of tap water, at a temperature of about 60° F. to 65° F., over a period of 5 to 10 minutes with emulsifying agitation. By such addition we find that the temperature is reduced to about 100° F. to 105° F., which is not higher than the melting point of the asphalt. It may be cooled to a lower temperature without any further advantage. We believe the effect of this cooling to be a setting of the asphalt in its emulsified form, so that the particles in the emulsion do not aggregate, and remain separated and small, giving the high degree of stability that characterizes the product.

The composition above described is one in which the weights of water and of asphalt are approximately equal, and in which the clay is present to about 4% by weight. It is of course to be understood that the combination of the materials is not one of chemical reaction in specific proportions, but merely one of physical association, and that in consequence deviation from the specific proportions is permitted.

The invention produces a superior asphalt emulsion having a wide range of utility. It mixes perfectly with water and may be applied with or without dilution as a coating, or paint. It has been used as a protective air-proof and water-proof coating on steel, iron, wood, brick, stone and other materials; for coating fiber boards, such as cork-board and other insulation material; for priming concrete roofs and floors that are to be insulated or weather-proofed. It may be used elsewhere for protective coatings, against air, water, moisture, acids, alkalis, gas, fumes, etc. As a dried coating it is ductile, strong, elastic and durable. It will not run or sag at elevated temperatures, nor become brittle nor crack at low temperatures. Its permanence in emulsion form renders it highly desirable as a marketable product for storage purposes.

We claim:

A method of forming a stable asphalt emulsion which comprises forming an emulsion from relatively small quantities of a heated colloidal clay suspension and an asphaltic substance heated considerably above its melting point, adding relatively large quantities of the same ingredients at substantially the same temperatures while agitating to emulsify the ingredients, then continuing the agitation until the emulsion cools to a temperature approximately as low as the melting point of the asphaltic substance, and then chilling the emulsion by simultaneously adding cold water thereto and continuing the agitation until the temperature of the emulsion is at least not higher than the melting point of the asphaltic substance.

In testimony whereof we have hereunto affixed our signatures.

LLOYD A. HALL.
EDWIN E. MORTELL.